(12) United States Patent
Higuchi

(10) Patent No.: US 10,442,408 B2
(45) Date of Patent: Oct. 15, 2019

(54) DRIVING SUPPORT DEVICE

(71) Applicant: TOYOTA JIDOSHA KABUSHIKI KAISHA, Toyota-shi, Aichi (JP)

(72) Inventor: Kazuma Higuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/955,192

(22) Filed: Apr. 17, 2018

(65) Prior Publication Data

US 2018/0339680 A1    Nov. 29, 2018

(30) Foreign Application Priority Data

May 24, 2017  (JP) .................... 2017-102273

(51) Int. Cl.

| B60S 1/56 | (2006.01) |
| B60R 1/00 | (2006.01) |
| B60K 37/00 | (2006.01) |
| B60R 11/04 | (2006.01) |
| G02B 27/00 | (2006.01) |
| B60K 37/06 | (2006.01) |
| G06F 3/0484 | (2013.01) |

(Continued)

(52) U.S. Cl.
CPC ............ *B60S 1/56* (2013.01); *B60K 37/06* (2013.01); *B60R 1/00* (2013.01); *B60R 1/002* (2013.01); *B60R 11/04* (2013.01); *G02B 27/00* (2013.01); *B60K 2370/1438* (2019.05); *B60R 2011/004* (2013.01); *B60R 2300/105* (2013.01); *B60R 2300/301* (2013.01); *B60R*
*2300/302* (2013.01); *B60R 2300/303* (2013.01); *B60R 2300/607* (2013.01); *B60R 2300/804* (2013.01); *G06F 3/0484* (2013.01); *G06F 3/04886* (2013.01)

(58) Field of Classification Search
None
See application file for complete search history.

(56) References Cited

U.S. PATENT DOCUMENTS

| 2007/0147660 A1* | 6/2007 | Durucan ............... B60K 35/00 382/104 |
| 2008/0074761 A1* | 3/2008 | Yamakawa ............ G02B 13/04 359/794 |

(Continued)

FOREIGN PATENT DOCUMENTS

| JP | 2012-217000 A | 11/2012 |
| JP | 2013-082358 A | 5/2013 |

*Primary Examiner* — Reza Aghevli
(74) *Attorney, Agent, or Firm* — Oliff PLC

(57) ABSTRACT

A driving support device includes a camera (21) for taking an image of a peripheral region of an own vehicle through a protection window (211), and a driving support module (10) for displaying a peripheral region screen on a display (50), to thereby support driving of the own vehicle by a driver. The device further includes a washer (22) capable of selectively carrying out any one of air washing of spraying air toward the protection window without spraying liquid and liquid washing of spraying liquid toward the protection window, and a switch section (530) for receiving an operation of instructing which of the air washing and the liquid washing is carried out. The driving support module causes the washer to carry out the air washing when a first operation is carried out; and cause the washer to carry out the liquid washing when a second operation is carried out.

5 Claims, 8 Drawing Sheets

(51) Int. Cl.
    *G06F 3/0488*     (2013.01)
    *B60R 11/00*     (2006.01)

(56) References Cited

U.S. PATENT DOCUMENTS

| | | | |
|---|---|---|---|
| 2009/0079828 A1* | 3/2009 | Lee | B60R 1/00 348/148 |
| 2011/0073142 A1* | 3/2011 | Hattori | B60S 1/0848 134/56 R |
| 2012/0117745 A1* | 5/2012 | Hattori | B60S 1/0848 15/250.01 |
| 2013/0037627 A1* | 2/2013 | Kikuta | B60S 1/485 239/284.1 |
| 2013/0215271 A1* | 8/2013 | Lu | H04N 7/18 348/148 |
| 2014/0192181 A1* | 7/2014 | Taylor | B60C 23/0408 348/118 |
| 2015/0185592 A1* | 7/2015 | Eineren | G03B 17/02 348/375 |
| 2016/0368417 A1* | 12/2016 | Bassi | B60R 1/00 |
| 2018/0222390 A1* | 8/2018 | Imaizumi | H04N 7/18 |
| 2018/0362085 A1* | 12/2018 | Shichino | H04N 5/35721 |
| 2018/0370432 A1* | 12/2018 | Imaizumi | B60R 1/00 |

\* cited by examiner

DRIVING SUPPORT DEVICE

BACKGROUND OF THE INVENTION

1. Field of the Invention

The present invention relates to a driving support device configured to cause a display to display a peripheral region screen containing images taken by cameras each configured to image a peripheral region of an own vehicle, to thereby support driving of the own vehicle by a driver.

2. Description of the Related Art

Hitherto, there has been known a driving support device configured to display an image taken by an vehicle-installed camera on a display, to thereby support the driving of a driver.

One of the related-art devices is configured to display a touch panel switch for camera washing on a screen on which an image taken by a vehicle-installed camera is displayed, and spray washing liquid reserved in a tank toward a protection window of the vehicle-installed camera for a spraying period set in advance when the touch panel switch is operated (for example, refer to paragraphs 0025 and 0028 of Japanese Patent Application Laid-open No. 2013-82358).

However, even when dirt (such as water droplets and dusts) that can be removed by spraying the air alone without spraying the washing liquid toward the protection window of the vehicle-installed camera is adhered to the protection window, the related-art device sprays the washing liquid in response to operation of the touch panel. As a result, with the related-art device, the washing liquid reserved in the tank decreases quickly, and the washing liquid reserved in the tank also becomes empty quickly. Thus, there is a problem in that frequency supplying the washing liquid increases.

SUMMARY OF THE INVENTION

The present invention has been made in view of the above-mentioned problem, and therefore has an object to provide a driving support device capable of washing protection windows and avoiding a quick decrease in washing liquid.

A driving support device (hereinafter also referred to as "the present invention device") according to the present invention comprises:

a camera (21), which includes a protection window (211), and is configured to take an image of a peripheral region of an own vehicle through the protection window;

a display (50), which is configured to display a peripheral region screen (511) including the image taken by the camera; and a driving support module (10), which is configured to display the peripheral region screen on the display, to thereby support driving of the own vehicle by a driver.

The present invention device further comprises;

a washer (22), which is capable of selectively carrying out any one of air washing of spraying air toward the protection window in order to wash the protection window without spraying liquid and liquid washing of spraying liquid toward the protection window in order to wash the protection window (211); and a switch section (530), which is configured to receive an operation of instructing which of the air washing and the liquid washing is to be carried out.

The driving support module is configured to:

cause the washer to carry out the air washing (Step 875) when a first operation is determined to be carried out on the switch section ("No" in Step 855); and cause the washer to carry out the liquid washing (Step 860) when a second operation is determined to be carried out on the switch section ("Yes" in Step 855).

With this configuration, the washer can be caused to carry out the air washing or the liquid washing in accordance with the operation carried out on the switch section.

Therefore, a passenger can select the air washing for dirt that can be removed through the air washing, and can select the liquid washing for dirt that can be removed through only by the liquid washing. Thus, with the present invention device, compared with the related-art device configured to carry out the liquid washing for all types of dirt, a frequency of the execution of the liquid washing can be decreased. Therefore, the liquid reserved in the tank can less likely to be decreased, and the washing liquid reserved in the tank can thus less likely to become empty.

In one aspect of the present invention, the display (50) includes a touch panel (50A) capable of displaying the peripheral region screen, the switch section is a switch of a touch detection type, which is capable of detecting a touch operation on the peripheral region screen (FRA', RTA', LTA', and RRA') displayed on the touch panel, and the driving support module is configured to determine which of the first operation and the second operation is carried out based on an operation mode of the touch operation (Step 810 to Step 855).

With this configuration, the switch section is provided as the touch panel configured to display the images taken by the cameras. Therefore, the passenger can check absence/presence and a degree of the dirt on the protection window based on the image displayed on the touch panel, and, simultaneously, when dirt is adhered to the protection window, can use the same touch panel to easily instruct appropriate washing (namely, any one of the air washing and the liquid washing) for the dirt. Thus, it is possible to improve convenience for the passenger when the protection window is washed.

In one aspect of the present invention, the camera includes a plurality of cameras (21A to 21D), the washer includes a plurality of washers (22A to 22D), and the switch section includes a plurality of switch sections (530A to 530D).

The respective plurality of cameras (21A to 21D) are arranged so as to take images of regions (FRA, RTA, LTA, and RRA) different from one another within the peripheral region. Further, the respective plurality of washers (22A to 22D) are provided to the respective plurality of cameras (21A to 21D).

In this case, the driving support module is configured to display images taken by the respective plurality of cameras (21A to 21D) on the touch panel so that the images taken by the respective plurality of cameras form individual regions (FRA', PTA', LTA', and RRA') corresponding to the respective plurality of cameras on the peripheral region screen (Step 750).

Further, the plurality of switch sections (530A to 530D) are provided for the respective individual regions (FRA', RTA', LTA', and RRA'), and the driving support module is further configured to determine which of the first operation and the second operation is carried out for each of the washers provided to the respective plurality of cameras corresponding to the respective individual regions based on an operation mode of the touch operation for each of the individual regions (refer to routine of FIG. 8).

With this configuration, the passenger sees the peripheral region screen to check the absence/presence of dirt, and, when dirt exists, carries out the touch operation for the individual region in which the dirt exists, and the washer corresponding to the individual region carries out the air washing or the liquid washing in accordance with the operation mode. As a result, the passenger easily recognizes which switch section (which individual region) is to be operated in which mode, and can thus more intuitively carry out the operation of instructing appropriate washing.

In one aspect of the present invention,
the driving support module is configured to:
determine that the first operation is carried out when a continuation period (TO) of the touch operation is shorter than a threshold period (TO1th) (Step 830, Step 835, and "No" in Step 855);
and determine that the second operation is carried out when the continuation period (TO) of the touch operation is equal, to or longer than the threshold period (TO1th) (Step 830, Step 835, and "Yes" in Step 855).

In other words, the driving support module is configured to determine that the first operation is carried out when a so-called "momentary press operation" is carried out on the switch section, and determine that the second operation is carried out when a so-called "press-and-hold operation" is carried out. As a result, the liquid washing is not carried out unless the press-and-hold operation is carried out, and a possibility of the execution of the liquid washing through an operation by mistake can be decreased. Thus, the washing liquid can less likely to be decreased.

In one aspect of the present invention, the driving support module is configured to spray the air alone toward the protection window after the liquid is sprayed when the washer is caused to carry out the liquid washing (refer to Step 860 and TL1 and TL2 of FIG. 6B).

With this configuration, when the liquid washing is carried out, and the liquid that has been previously sprayed remains on the protection window, the liquid can be blown off by the air. Thus, after the liquid washing, a possibility that "the washing liquid remains in a form of droplets on the protection window, foreign matters, dust, and the like are further mixed with the droplets, and the droplets are dried while the foreign matters, the dust, and the like are adhered to the protection window" can be decreased.

In the description given above, in order to facilitate understanding of the present invention, names and/or reference symbols used in embodiments of the present invention described later are enclosed in parentheses and assigned to components of the invention corresponding to the embodiments. However, respective components of the present invention are not limited to the embodiments prescribed by the names and/or reference symbols. Other objects, other features, and accompanying advantages of the present invention can be readily understood from a description of the embodiments of the present invention provided referring to the accompanying drawings.

DESCRIPTION OF THE EMBODIMENTS

A description is now given of a driving support device according to an embodiment of the present invention with reference to the drawings.

Figure 1:
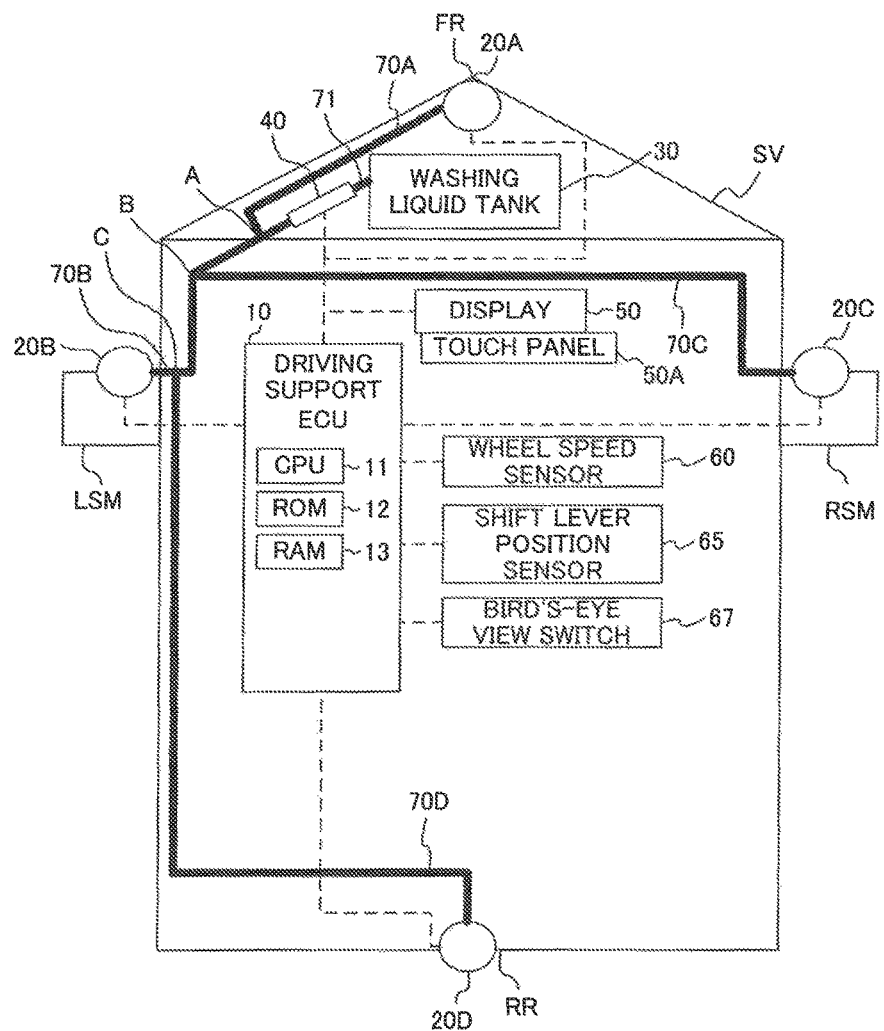
FIG. 1 is a schematic system configuration diagram for illustrating a driving support device (this support device) according to an embodiment of the present invention.

FIG. 1 is a schematic system configuration diagram for illustrating the driving support device (hereinafter sometimes referred to as "this support device") according to the embodiment of the present invention. When a vehicle in which this support device is installed is required to be distinguished from another vehicle, the vehicle is referred to as "own vehicle SV". This support device is a device configured to present images taken by cameras, which image a peripheral region of the own vehicle SV, to a driver, to thereby support driving of the driver, and further has a function of washing protection windows of the cameras.

This support device includes a driving support ECU 10. An ECU is an abbreviation of "electronic control unit", and includes a microcomputer as a main component. The microcomputer includes a CPU 11 and storage devices such as a ROM 12 and a RAM 13. The CPU 11 executes instructions (programs and routines) stored in the ROM 12, to thereby archive various functions.

This support device further includes a front camera system 20A, a left side camera system 20B, a right side camera system 20C, a rear camera system 20D, a washing liquid tank 30, a washing liquid pump 40, a display 50, wheel speed sensors 60, a shift lever position sensor 65, and a bird's-eye view switch 67. The front camera system 20A, the left side camera system 20B, the right side camera system 20C, and the rear camera system 20D are referred to as "camera systems 20" when those systems are not required to be distinguished from one another. The driving support ECU 10 is connected to the camera systems 20, the washing liquid pump 40, the display 50, the wheel speed sensors 60, the shift lever position sensor 65, and the bird's-eye view switch 67.

First, a description is given of the camera systems 20.

The front camera system 20A is provided at a center in a vehicle widthwise direction in a front end part FR of the own vehicle SV. The left side camera system 20B is provided on a left side of the own vehicle SV. The right side camera system 20C is provided on a right side of the own vehicle SV. The rear camera system 20D is provided at the center in the vehicle widthwise direction in a rear end part RR of the own vehicle SV.

Figure 2A:
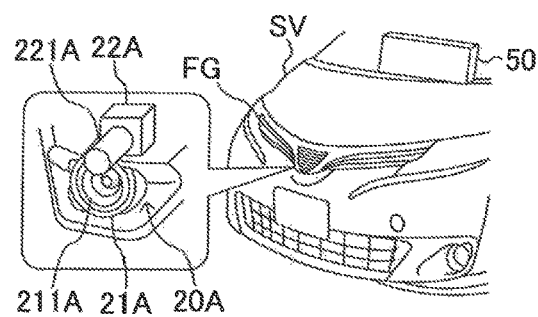
FIG. 2A is an explanatory diagram for illustrating a mounting position of a front camera system illustrated in FIG. 1.
Figure 2B:
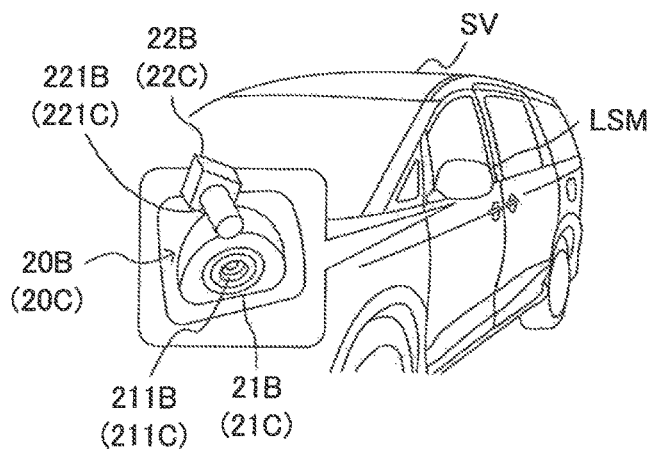
FIG. 2B is an explanatory diagram for illustrating a mounting position of a left side camera system illustrated in FIG. 1.
Figure 2C:
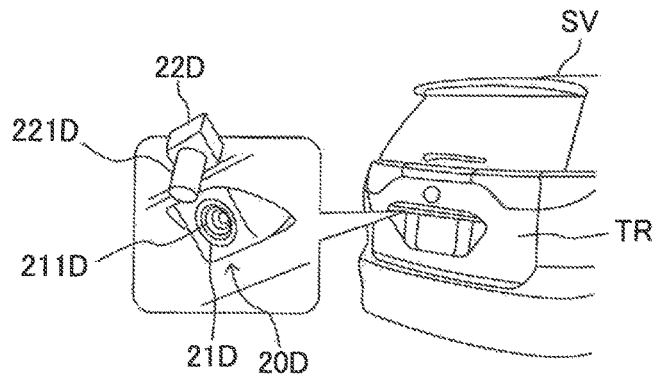
FIG. 2C is an explanatory diagram for illustrating a mounting position of a rear camera system illustrated in FIG. 1.

More specifically, as illustrated in FIG. 2A, the front camera system 20A is provided at a center in the vehicle widthwise direction of a front grille FG of the own vehicle SV. As illustrated in FIG. 2B, the left side camera system 20B is provided in a left side mirror LSM of the own vehicle SV. The right side camera system 20C is provided in a right side mirror RSM of the own vehicle SV in the same manner as the left side camera system 20B. As illustrated in FIG. 2C, the rear camera system 20D is provided at a center in the vehicle widthwise direction of a trunk TR of the own vehicle SV.

As illustrated in FIG. 2A, the front camera system 20A includes a camera 21A configured to image a scenery of a region that can be imaged, and a washer 22A configured to wash a protection window 211A of the camera 21A. The protection window 211A is a light-transmitting plate member (e.g., a window made of transparent glass or transparent resin) (not shown), and provided to protect a lens of the camera 21A from mud, dust, and the like.

Figure 3:
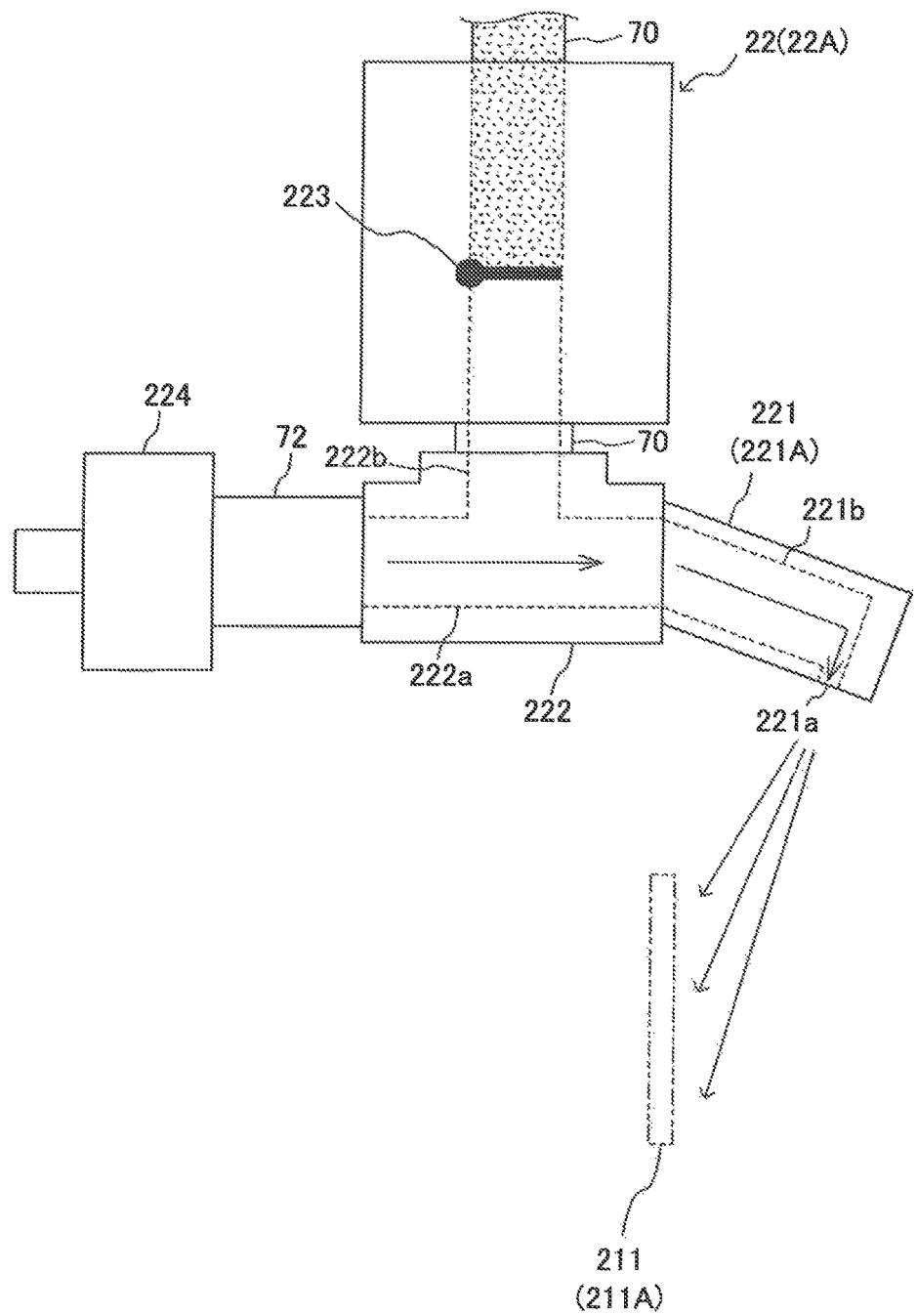
FIG. 3 is a detailed explanatory diagram for illustrating a washer.

The washer 22A includes a nozzle 221A. The nozzle 221A protrudes to an outside of the vehicle above the protection window 211A. As illustrated in FIG. 3, a spray opening 221a is formed in a vicinity of a tip portion of the nozzle 221A so as to oppose the protection window 211A. The washer 22A is capable of selectively carrying out any one of air washing and liquid washing.

The air washing means washing of the protection window 211A carried out by spraying compressed air alone from the spray opening 221a toward the protection window 211A without spraying the washing liquid. The liquid washing means washing of the protection window 211A carried out by first spraying a mixture of the washing liquid and the compressed air from the spray opening 221a toward the protection window 211A, and then spraying the compressed air alone. In this example, the washing liquid is water, but may be liquid containing detergent.

Similarly, as illustrated in FIG. 2B, the camera system 20B includes a camera 21B and a washer 22B. The camera 21B includes a protection window 211B. The washer 22B includes a nozzle 221B, and is configured to spray the compressed air or the mixture of the washing liquid and the compressed air from a spray opening (not shown), and provided in a vicinity of a tip of the nozzle 221B, toward the protection window 211B, to thereby wash the protection window 211B. In other words, the washer 22B is capable of selectively carrying out any one of the air washing and the liquid washing.

Further, the camera system 20C includes a camera 21C and a washer 22C. The camera 21C includes a protection window 211C. The washer 22C includes a nozzle 221C, and is configured to spray the compressed air or the mixture of the washing liquid and the compressed air from a spray opening (not shown), and provided in a vicinity of a tip of the nozzle 221C, toward the protection window 211C, to thereby wash the protection window 211C. In other words, the washer 22C is capable of selectively carrying out any one of the air washing and the liquid washing.

Similarly, as illustrated in FIG. 2C, the camera system 20D includes a camera 21D and a washer 22D. The camera 21D includes a protection window 211D. The washer 22D includes a nozzle 221D, and is configured to spray the compressed air or the mixture of the washing liquid and the compressed air from a spray opening (not shown), and provided in a vicinity of a tip of the nozzle 221D, toward the protection window 211D, to thereby wash the protection window 211D. In other words, the washer 22D is capable of selectively carrying out any one of the air washing and the liquid washing.

In the following, when the cameras 21A to 21D are not required to be distinguished from one another, the cameras 21A to 21D are referred to as "cameras 21". When the washers 22A to 22D do not need to be distinguished from one another, the washers 22A to 22D are referred to as "washers 22". When the protection windows 211A to 211D are not required to be distinguished from one another, the protection windows 211A to 211D are referred to as "protection windows 211". When the nozzles 221A to 221D are not required to be distinguished from one another, the nozzles 221A to 221D are referred to as "nozzles 221".

The respective cameras 21 illustrated in FIG. 1 are connected to the driving support ECU 10. Each of the cameras 21 is configured to transmit image data representing the image taken each time a predetermined period has elapsed to the driving support ECU 10.

The washing liquid is reserved in the washing liquid tank 30. The washing liquid pump 40 is configured to draw the washing liquid reserved in the washing liquid tank 30 through a rotation of an electric motor, and then pressure-feed (supply) the washing liquid to the washers 22 of the respective camera systems 20. The electric motor of the washing liquid pump 40 is connected to the driving support ECU 10, and is configured to receive a command from the driving support ECU 10, to thereby activate (rotate) or stop itself.

The washing liquid pump 40 and the left side camera system 20B are connected with each other via a pipe 70B. A pipe 70A connected to the front camera system 20A branches at a branch point A of the pipe 70B. Further, a pipe 70C connected to the right side camera system 20C branches at a branch point B of the pipe 70B. Further, a pipe 70D connected to the rear camera system 20D branches at a branch point C of the pipe 70B. Further, the washing liquid pump 40 and the washing liquid tank 30 are connected with each other via a pipe 71.

When the pipes 70A to 70D are not required to be distinguished from one another, the pipes 70A to 70D are referred to as "pipes 70".

Referring to FIG. 3, a description is now given of the washer 22 of the camera system 20.

The washer 22 includes, in addition to the nozzle 221, a merging joint 222, an on-off valve 223, and an air pump 224. The nozzle 221, is attached to one end in a lengthwise direction of the merging joint 222, and an air pump 224 is attached to another end via a pipe 72. Further, "the pipe 70 connected to the washing liquid pump 40, and configured to supply the washing liquid to the washer 22" is connected to one end in a direction perpendicular to the lengthwise direction of the merging joint 222, and the on-off valve 223 is provided in the pipe 70.

The spray opening 221a and the flow passage 221b are provided in the nozzle 221. As described above, the spray opening 221a is provided at the location of the nozzle 221 opposing the protection window 211 of the camera 21. The flow passage 221b is provided from an end on a merging joint 222 side of the nozzle 221 toward the spray opening 221a.

The on-off valve 223 is provided in the pipe 70 in a vicinity of the washer 22, and is configured to open/close a flow passage of the washing liquid in the pipe 70 for supplying the washing liquid to the washer 22. More specifically, the on-off valve 223 of the washer 22A is provided at a desired position of the pipe 70A between the branch point A illustrated in FIG. 1 and the washer 22A. The on-off valve 223 of the washer 22B is provided at a desired position of the pipe 70B between the branch point C illustrated in FIG. 1 and the washer 22B. The on-off valve 223 of the washer 22C is provided at a desired position of the pipe 70C between the branch point B illustrated in FIG. 1 and the washer 22C. The on-off valve 223 of the washer 22D is provided at a desired position of the pipe 70D between the branch point C illustrated in FIG. 1 and the washer 22D. As a result, the respective on-off valves 223 are configured to open/close the flow passages of the pipes configured to supply the washing liquid to the washers 22 corresponding to the respective on-off valves 223.

The on-off valve 223 is an electromagnetic on-off valve connected to the driving support ECU 10. The on-off valve 223 is configured to set an own state to any one of an open state and a closed state in response to a command from the driving support ECU 10. When the on-off valve 223 is in the open state, the flow passage is opened by the on-off valve 223, and the washing liquid thus flows through the flow passage. On the other hand, when the on-off valve 223 is in the closed state, the flow passage is closed by the on-off valve 223, and the washing liquid is thus blocked in the flow passage.

The air pump 224 is configured to compress the air through rotation of an electric motor, and discharge the compressed air from the pipe 72 connected to itself. The electric motor of the air pump 224 is connected to the driving support ECU 10, and is configured to receive a command from the driving support ECU 10, to thereby activate (rotate) or stop itself.

A first flow passage 222a and a second flow passage 222b are formed in a T shape inside the merging joint 222. More specifically, the first flow passage 222a is formed so as to pass through the merging joint 222 in the lengthwise direction, and the second flow passage 222b is formed in a direction perpendicular to the first flow passage 222a from a middle point of the first passage 222a. One end of the first flow passage 222a is connected to the pipe 72, and the other end of the first flow passage 222a is connected to the flow passage 221b of the nozzle 221. Further, one end of the second flow passage 222b is connected to the pipe 70, and the other end of the second flow passage 222b is connected to the first flow passage 222a.

When this support device causes the washer 22 to carry out the air washing, this support device is configured to activate the air pump 224, and bring the on-off valve 223 into the closed state. When the air pump 224 is activated, the compressed air passes through the pipe 72, passes through the first flow passage 222a in the merging joint 222, passes through the flow passage 221b in the nozzle 221, and is sprayed from the spray opening 221a of the nozzle 221. This support device is configured to stop the operation of the air pump 224 at a time point at which a predetermined period TA1 (refer to FIG. 6A) has elapsed since a time point at which the air pump 224 is activated.

On the other hand, when this support device causes the washer 22 to carry out the liquid washing, this support device activates the air pump 224, and brings the on-off valve 223 into the open state. Further, this support device activates the washing liquid pump 40 at a time point when the on-off valve 223 is set to the open state. In this case, the washing liquid passes through the pipe 70, passes through the second flow passage 222b in the merging joint 222, and flows into the first flow passage 222a. Further, the compressed air passes through the pipe 72, and flows into the first flow passage 222a. As a result, the washing liquid and the compressed air are mixed in the first flow passage 222a, a mixture resulting from the mixing of the washing liquid and the compressed air passes through the flow passage 221b in the nozzle 221, and is sprayed from the spray opening 221a of the nozzle 221.

This support device is configured to set the on-off valve 223 to the closed state at a point at which a predetermined period TL1 (refer to FIG. 6B) has elapsed since "a time point at which the air pump 224 is activated and the on-off valve 223 is brought into the open state", and stop the washing liquid pump 40 at a time point at which the on-off valve 223 is set to the closed state. Further, this support device is configured to stop the operation of the air pump 224 at a time point at which a predetermined period TA2 (refer to FIG. 6B) has elapsed since "the time point at which the air pump 224 is activated and the on-off valve 223 is brought into the open state". The predetermined period TA2 is set to a value larger than the predetermined period TL1, and, after the mixture containing the washing liquid (liquid) is sprayed from the spray opening 221a, the compressed air alone is sprayed from the spray opening 221a. As a result, the washing liquid remaining on the protection window 211 can be blown off by the compressed air, and, a possibility that "the washing liquid remains in a form of droplets on the protection window 211 after the liquid washing, foreign matters, dust, and the like are further mixed with the droplets, and the droplets are dried while the foreign matters, the dust, and the like are adhered to the protection window 211" can be decreased.

The display 50 illustrated in FIG. 1 includes a touch panel (display of a touch panel type) 50A. The display 50 is configured to receive display information from various ECUs and a navigation device in the own vehicle SV, and display the display information on the touch panel 50A. When a passenger of the own vehicle SV touches a screen of the touch panel 50A, the display 50 receives an operation input corresponding to a touched position. As illustrated in FIG. 2A, the display 50 is disposed above an instrumental panel in a cabin of the own vehicle SV.

The wheel speed sensor 60 is provided for each of wheels of the own vehicle SV, and detects a predetermined number of pulse signals (wheel pulse signals) output each time each of the wheels has rotated once. Then, the wheel speed sensor 60 transmits the detected wheel pulse signal to the driving support ECU 10. The driving support ECU 10 calculates a rotation speed (wheel speed) of each of the wheels based on the number of pulses per unit period of the wheel pulse signal transmitted from each of the wheel speed sensors 60, and calculates a speed (vehicle speed) Vs of the own vehicle SV based on the wheel speeds of the respective wheels.

The shift lever position sensor 65 is configured to detect a range to which a shift lever of an automatic transmission (not shown) is set, and output a signal (range signal) corresponding to the detected range. The driving support ECU 10 is configured to recognize the range to which the shift lever is set based on the range signal received from the shift lever position sensor 65. The shift lever is set to any one of "a drive range (D), a reverse range (R), a neutral range (N), and a parking range (P)". When the shift lever is set to the drive range, and a brake is not applied, the own vehicle SV moves forward. On the other hand, when the shift lever is set to the reverse range, and the brake is not applied, the own vehicle SV moves backward.

The bird's-eye view switch 67 is a physical switch provided in a vicinity of the steering wheel of the own vehicle SV, and is used to display a low-speed driving support screen 500 including a bird's-eye view screen 510 described later on the display 50. The bird's-eye view switch 67 is configured to transition to an on state when a depression operation is carried out in an off state, and transition to the off state when the depression operation is carried out in the on state. When the bird's-eye view switch 67 is in the on state, the bird's-eye view switch 67 outputs an operation signal (high-level signal) to the driving support ECU 10.

Figure 4:
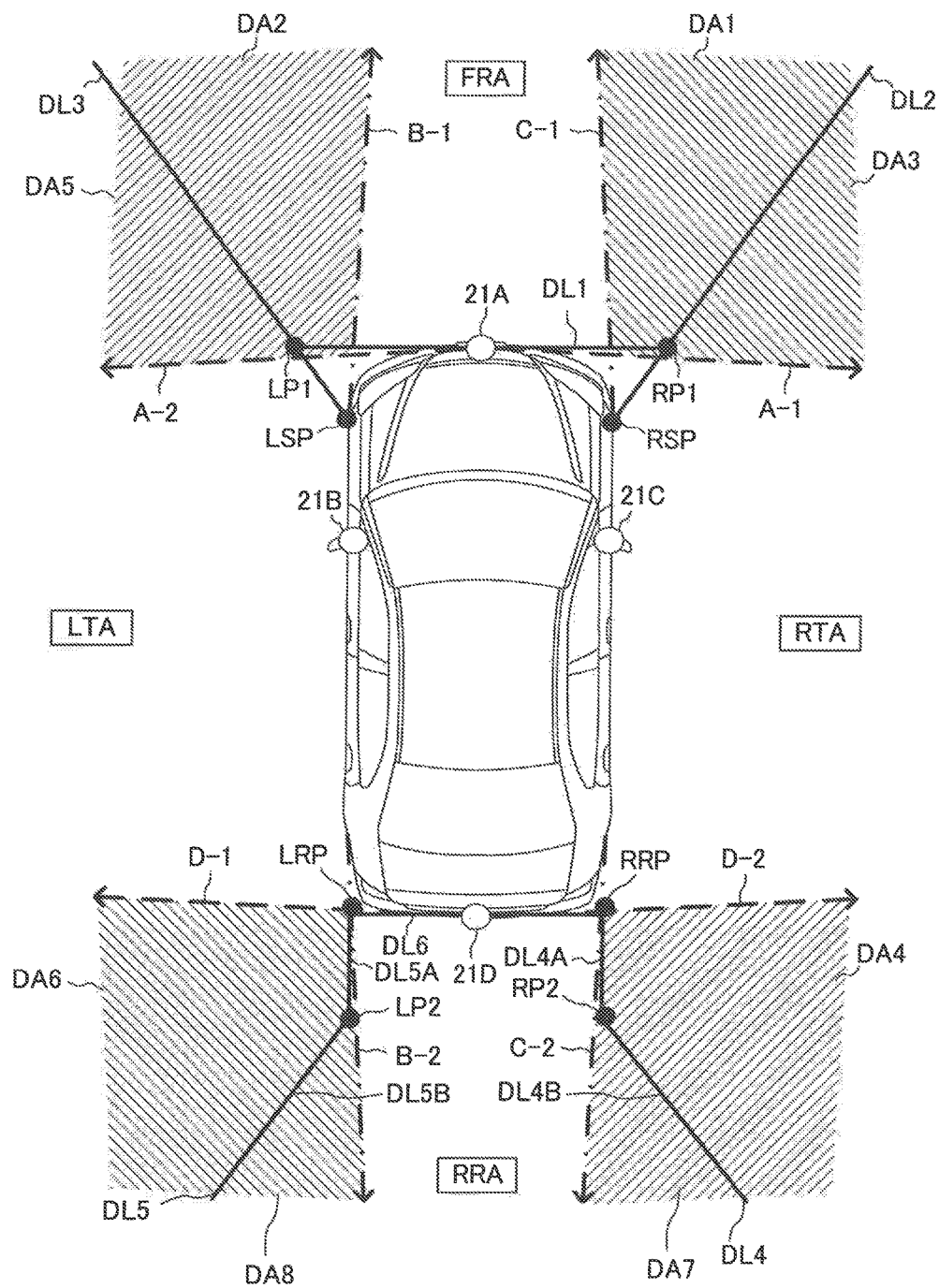
FIG. 4 is an explanatory diagram for illustrating imaging regions of respective cameras.

Referring to FIG. 4, a description is now given of imaged regions of the respective cameras 21. A fisheye lens or the like is employed as a lens of each of the cameras 21, and a view angle of each of the cameras 21 is equal to or larger than 180 degrees. Thus, the imaging ranges of the respective cameras 21 are as illustrated in FIG. 4.

More specifically, the imaging range of the camera 21A is a range between the line A-1 and the line A-2 indicated as broken lines. The imaging range of the camera 21B is a range between the line B-1 and the line B-2 indicated as dashed-dotted lines. The imaging range of the camera 21C is a range between the line C-1 and the line C-2 indicated as dashed-dotted lines. The imaging range of the camera 21D is a range between the line D-1 and the line D-2 indicated as broken lines. The driving support ECU 10 is configured to use the images taken by all the cameras 21A to 21D, to thereby recognize an entire periphery of the own vehicle SV.

(Overview of Operation)

A description is now given of an overview of an operation of this support device. This support device is configured to display the low-speed driving support screen 500 (refer to FIG. 5) for supporting the driving of the driver during low-speed driving on the touch panel 50A of the display 50 when both the following conditions (1) and (2) are satisfied.

(1) The vehicle speed Vs of the own vehicle SV is equal to or less than a threshold speed Vs1th.

(2) The shift lever position is in any one of a drive range (D), a reverse range (R), and a neutral range (N).

This support device acquires pieces of image data from the respective cameras 21A to 21D each time a predetermined period has elapsed. Then, this support device generates image data (hereinafter referred to as "3D image data") in a 3D curved surface form of the peripheral region of the own vehicle SV based on the acquired image data. More specifically, this support device projects each of pixel values of the image data of the respective cameras 21A to 21D to a pixel contained in a 3D curved surface in a semispherical surface form. A bottom surface of the 3D curved surface is centered around the own vehicle SV. The pixel of the image data and the pixel of the 3D curved surface corresponding thereto are associated with each other in advance. This support device uses the generated 3D image data, to thereby display the low-speed driving support screen 500.

Generation processing itself for such 3D image data is a widely-known technology (for example, refer to Japanese Patent Application Laid-open No. 2012-217000).

Figure 5:
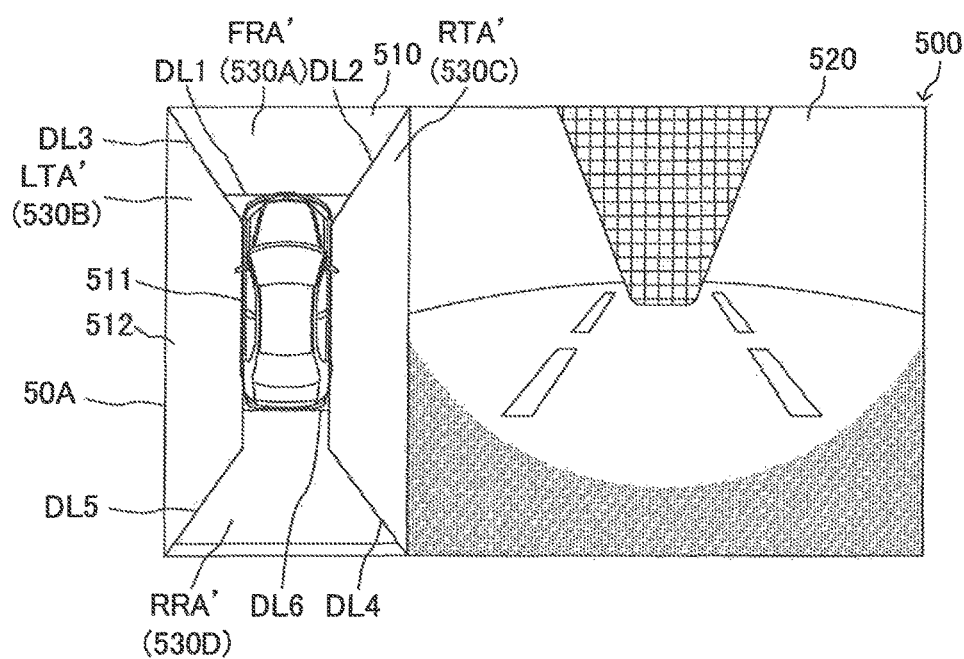
FIG. 5 is an explanatory diagram for illustrating a low-speed driving support screen.

Referring to FIG. 5, a description is now given of the low-speed driving support screen 500.

The low-speed driving support screen 500 includes the bird's-eye view screen 510 and a range-associated screen 520. An own vehicle image 511 and a peripheral region image 512 are displayed on the bird's-eye view screen 510. The own vehicle image 511 is an image of the own vehicle SV when the own vehicle SV is viewed directly from above (viewed in the bird's-eye view), and is set to this support device in advance. The peripheral region image 512 is an image obtained when the peripheral region of the own vehicle SV is viewed directly from above in the 3D image data.

An image viewed in a direction corresponding to the range of the shift lever from a view point corresponding to the range of the shift lever in the 3D image data is displayed in the range-associated screen 520. When the shift lever position is in any one of the drive range and the neutral range, as illustrated in FIG. 5, an image viewed from a view point in the rear of the own vehicle SV toward the front of the own vehicle SV in the 3D image data is displayed in the range corresponding screen 520. On the other hand, when the shift lever position is in the reverse range, an image viewed from a view point in front of the own vehicle SV toward the rear of the own vehicle SV in the 3D image data is displayed in the range corresponding screen 520, which is not shown in FIG. 5.

The 3D image data is divided in advance so as to form a front region FRA, a right side region RTA, a left side region LTA, and a rear region RRA illustrated in FIG. 4 when the own vehicle SV is viewed directly from above. Specifically, pixels contained in the front region FRA of the 3D image data and the pixels of the image data of the camera 21A are associated with each other. Pixels contained in the right side region RTA of the 3D image data and the pixels of the image data of the camera 21B are associated with each other. Pixels contained in the left side region LTA of the 3D image data and the pixels of the image data of the camera 21C are associated with each other. Pixels contained in the rear region RRA of the 3D image data and the pixels of the image data of the camera 21D are associated with each other.

A detailed description is now given of shapes of the respective regions FRA, RTA, LTA, and RRA.

The front region FRA is a region on a front side of the own vehicle SV, and is a region partitioned by partition lines DL1, DL2, and DL3 illustrated in FIG. 4. The partition line DL1 is a line segment connecting a point RP1 positioned on the right side by a predetermined distance from a front end portion of a right side surface of the own vehicle SV and a point LP1 positioned on the left side by a predetermined distance from a front end portion of a left side surface of the own vehicle SV with each other. A partition line DL2 is a line segment from a point RSP positioned on a front side of the right side surface of the own vehicle SV to a predetermined distance along a straight line passing through the point RSP and the point RP1. Similarly, a partition line DL3 is a line segment from a point LSP positioned on a front side of the left side surface of the own vehicle SV to a predetermined distance along a straight line passing through the point LSP and the point LP1.

More specifically, the front region FRA is a region that satisfies both the following two conditions.

A region on the front side of the own vehicle SV with respect to the partition line DL1.

A region on a camera 21A side with respect to "the line segment DL2 from the point RP1", and simultaneously on the camera 21A side with respect to "the line segment DL3 from the point LP1".

In a region (DA1) filled with oblique lines from the partition line DL2 to the line C-1 indicated as the dashed-dotted line, an imaging region of the camera 21A and an imaging region of the camera 21C overlap each other. Pixels contained in the region DA1 of the 3D image data are associated with pixels of the image data of the camera 21A. Further, in a region (DA2) filled with oblique lines from the partition line DL3 to the line B-1 indicated as the dashed-dotted line, the imaging region of the camera 21A and an imaging region of the camera 21B overlap each other. Pixels contained in the region DA2 of the 3D image data are associated with pixels of the image data of the camera 21A.

The right side region PTA is a region on a right side of the own vehicle SV, and is a region partitioned by the partition line DL2 and a partition line DL4 illustrated in FIG. 4. The partition line DL4 includes a line DL4A and a line DL4B. The line DL4A is a line extending in parallel with a longitudinal axis of the own vehicle SV from a point RRP indicating a rear end part of the right side surface of the own vehicle SV to a point RP2 positioned in the rear by a predetermined distance. The line DL4B is a line from the point RP2 to a predetermined distance along a straight line bent toward the right side so that an angle at the point RP2 with respect to the line DL4A takes a predetermined value.

More specifically, the right side region RTA is a region that satisfies both the following two conditions.
  A region on a camera 21C side with respect to "the partition line DL2 from the point RSP".
  A region on the camera 21C side with respect to the partition line DL4.

In a region (DA3) filled with oblique lines from the partition line DL2 to the line A-1 indicated as the broken line, an imaging region of the camera 21A and an imaging region of the camera 21C overlap each other. Pixels contained in the region DA3 of the 3D image data are associated with pixels of the image data of the camera 21C. Further, in a region (DA4) filled with oblique lines from the partition line DL4 to the line D-2 indicated as the broken line, the imaging region of the camera 21B and an imaging region of the camera 21D overlap each other. Pixels contained in the region DA4 of the 3D image data are associated with pixels of the image data of the camera 21C.

The left side region LTA is a region on a left side of the own vehicle SV, and is a region partitioned by the partition line DL3 and a partition line DL5. The partition line DL5 includes a line DL5A and a line DL5B. The line DL5A is a line extending in parallel with a longitudinal axis of the own vehicle SV from a point LRP indicating a rear end part of the left side surface of the own vehicle SV to a point LP2 positioned in the rear by a predetermined distance. The line DL5B is a line from the point LP2 to a predetermined distance along a straight line bent toward the left side so that an angle at the point LP2 with respect to the line DL5A takes a predetermined value.

More specifically, the left side region LTA is a region that satisfies both the following two conditions.
  A region on a camera 21B side with respect to "the partition line DL3 from the point LSP".
  A region on the camera 21B side with respect to the partition line DL5.

In a region (DA5) filled with oblique lines from the partition line DL3 to the line A-2 indicated as the broken line, an imaging region of the camera 21A and an imaging region of the camera 21B overlap each other. Pixels contained in the region DA5 of the 3D image data are associated with pixels of the image data of the camera 21B. Further, in a region (DA6) filled with oblique lines from the partition line DL5 to the line D-1 indicated as the broken line, the imaging region of the camera 21B and an imaging region of the camera 21D overlap each other. Pixels contained in the region DA6 of the 3D image data are associated with pixels of the image data of the camera 21B.

The rear side region RRA is a region on a rear side of the own vehicle SV, and is a region partitioned by the partition line DL4, the partition line DL5, and the partition line DL6. The partition line DL6 is a line segment connecting the point RRP and the point LRP at the own vehicle SV.

More specifically, the rear region RRA is a region that satisfies both the following two conditions.
  A region on the rear side of the own vehicle SV with respect to the partition line DL6.
  A region on a camera 21D side with respect to the line segment DL4, and simultaneously on the camera 21D side with respect to the line segment DL5.

In a region (DA7) filled with oblique lines from the partition line DL4 to the line C-2 indicated as the dashed-dotted line, an imaging region of the camera 21D and an imaging region of the camera 21C overlap each other. Pixels contained in the region DA7 of the 3D image data are associated with pixels of the image data of the camera 21D. Further, in a region (DA8) filled with oblique lines from the partition line DL5 to the line B-2 indicated as the dashed-dotted line, the imaging region of the camera 21D and an imaging region of the camera 21B overlap each other. Pixels contained in the region DA8 of the 3D image data are associated with pixels of the image data of the camera 21D.

In this manner, this support device is configured to partition the peripheral region of the own vehicle SV in the 3D image data into the regions (individual regions) corresponding to the cameras 21. Further, this support device is configured to associate the pixels contained in the respective partitioned individual regions and the pixels of the image data of the cameras 21 corresponding to the respective individual regions with each other in advance.

Regions FRA', RTA', LTA', and RRA' of the peripheral region image 512 contained in the bird's-eye view screen 510 illustrated in FIG. 5 are individual regions in which the pixels contained in the respective regions FRA, PTA, LTA, and RRA of the 3D image data are displayed. In FIG. 5, the partition lines DL1 to DL6 configured to partition the respective regions FRA', RTA', LTA', and RRA' are illustrated for the sake of description, but are not actually displayed.

In other words, the image taken by the camera 21A is displayed in the region FRA' in the peripheral region image 512 illustrated in FIG. 5. The image taken by the camera 21B is displayed in the region LTA'. The image taken by the camera 21C is displayed in the region RTA'. The image taken by the camera 21D is displayed in the region RRA'.

When this support device displays the low-speed driving support screen 500, this support device sets, to the respective regions FRA', LTA', RTA', and RRA' in the peripheral region image 512, switch sections 530A to 530D configured to receive "an operation of activating the washers 22 configured to wash the protection windows 211 of the respective cameras 21 corresponding to the respective regions FRA', LTA', RTA', and RPA'".

Specifically, a function of the front switch section 530A is assigned to the region FRA'. A function of the left side switch section 530B is assigned to the region LTA'. A function of the right side switch section 530C is assigned to the region RTA'. A function of the rear switch section 530D is assigned to the region RRA'. When the respective switch sections 530A to 530D do not need to be distinguished from one another, the switch sections 530A to 530D are referred to as "switch sections 530".

In other words, when the region FRA' is touched by the passenger (touch operation is carried out on the region FRA'), this support device activates the washer 22A. When the touch operation is carried out on the region LTA', this support device is configured to activate the washer 22B.

When the touch operation is carried out on the region RTA', this support device activates the washer 22C. When the touch operation is carried out on the region RRA', this support device activates the washer 22D.

As described above, the washer 22 is capable of selectively carrying out the air washing and the liquid washing. Therefore, when a continuation period (operation period TO) of a state in which the touch operation is being carried out by the passenger of the own vehicle SV on the region set to the switch section 530 of the peripheral region image 512 is equal to or shorter than a threshold period TO1th, this support device determines that an operation of instructing the air washing is carried out. Then, this support device causes "the washer 22 corresponding to the switch section 530 set to the region on which the touch operation is carried out" (hereinafter sometimes referred to as "corresponding washer 22") to carry out the air washing. On the other hand, when the operation period TO of the switch section 530 is longer than the threshold period TO1th, this support device determines that an operation of instructing the liquid washing is carried out, and causes the corresponding washer 22 to carry out the liquid washing. The operation of instructing the air washing is sometimes referred to as "first operation or operation in the first mode". The operation of instructing the liquid washing is sometimes referred to as "second operation or operation in the second mode".

Figure 6A:
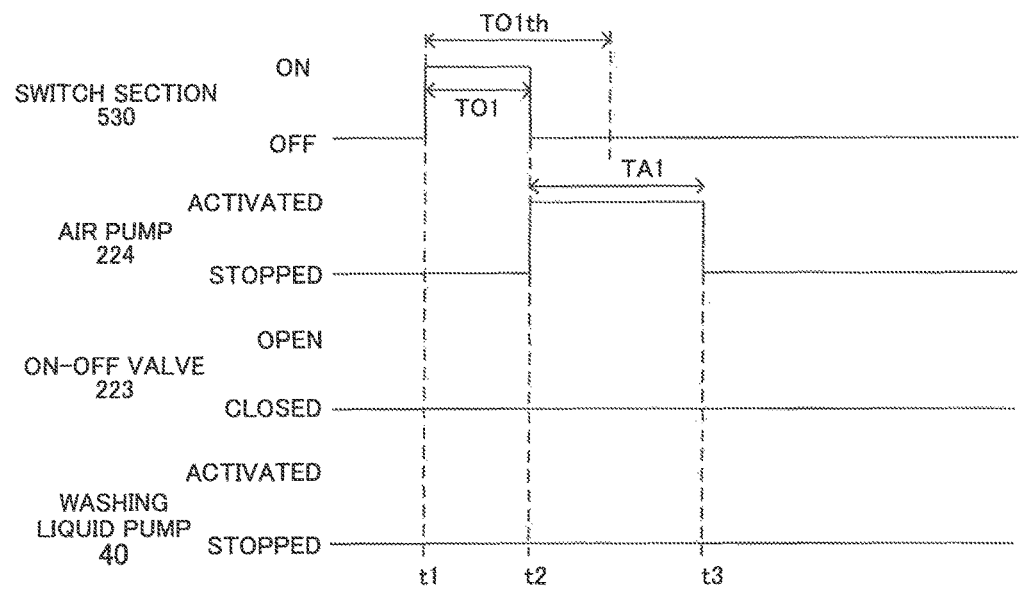
FIG. 6A is a time chart for illustrating operations of a switch section, an air pump, an on-off valve, and a washing liquid pump when air washing is carried out.

Referring to FIG. 6A, a detailed description is now given of operations of the air pump 224, the on-off valve 223, and the washing liquid pump 40 at a time when the air washing is carried out.

In the example illustrated in FIG. 6A, the touch operation on the switch section 530 of any one of the switch sections 530A to 530D is started at a time point t1, and this touch operation is finished at a time point t2 at which a period TO1 has elapsed since the time point t1. Thus, the operation period TO of the switch section 530 is the period TO1, and, as illustrated in FIG. 6A, this operation period TO1 is shorter than the threshold period TO1th set in advance. Thus, this support device determines that the operation (first operation) of instructing the air washing is carried out.

Therefore, this support device activates the air pump 224 of the corresponding washer 22 of the operated switch section 530 at the time point t2 at which the operation on the switch section 530 is finished. This support device stops the operation of the air pump 224 at a time point t3 at which the predetermined period TA1 has elapsed since the time point t2. This support device maintains the washing liquid pump 40 in a stopped state, and maintains the on-off valve 223 in the closed state unless the operation (second operation) of instructing the liquid washing is carried out as described later.

As a result, the air pump 224 draws the air, compresses the drawn air, and discharges the compressed air to the pipe 72 in a period from the time point t2 to the time point t3. The compressed air is sprayed from the spray opening 221a of the nozzle 221 toward the protection window 211 of the camera 21, thereby washing the protection window 211. In contrast, the on-off valve 223 continues to close the flow passage in the pipe 70 in the period from the time point t2 to the time point t3, the washing liquid is not sprayed from the spray opening 221a, and the compressed air alone is sprayed from the spray opening 221a.

Figure 6B:
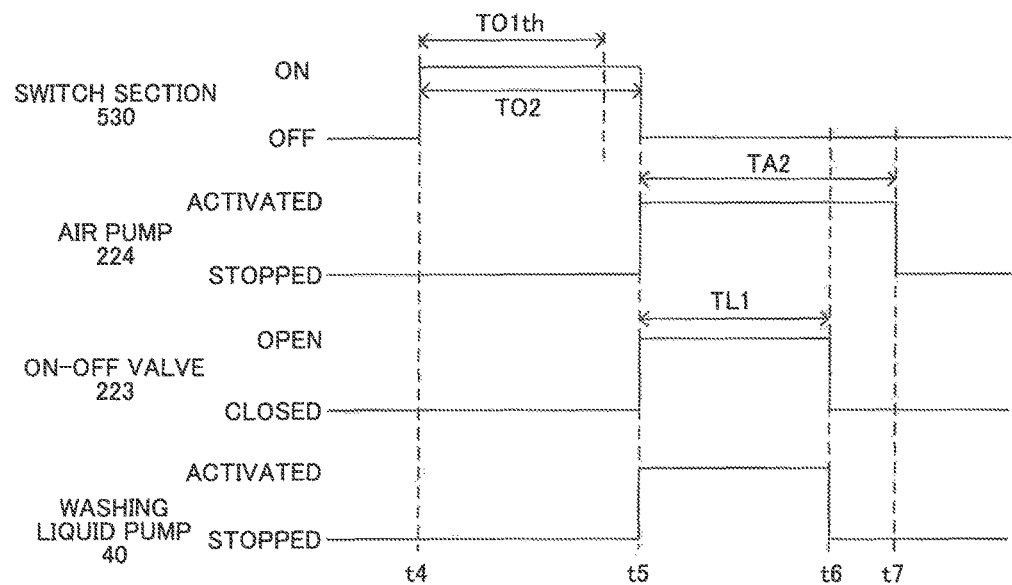
FIG. 6B is a time chart for illustrating operations of the switch section, the air pump, the on-off valve, and the washing liquid pump when liquid washing is carried out.

Referring to FIG. 6B, a detailed description is now given of operations of the air pump 224, the on-off valve 223, and the washing liquid pump 40 when the liquid washing is carried out.

In an example illustrated in FIG. 6B, the touch operation on any one of the switch sections 530 is started at a time point t4, and this touch operation is finished at a time point t5 at which a period TO2 has elapsed since the time point t4. Thus, the operation period TO of the switch section 530 is the period TO2, and, as illustrated in FIG. 6B, this operation period TO2 is longer than the threshold period TO1th. Thus, this support device determines that the operation (second operation) of instructing the liquid washing is carried out.

Therefore, this support device activates the washing liquid pump 40, and opens the on-off valve 223 of the corresponding washer 22 of the operated switch section 530, to thereby open the flow passage of the corresponding washer 22 at the time point t5 at which the operation on the switch section 530 is finished. Further, this support device activates the air pump 224 of the washer 22 at the time point t5. As a result, the mixture of the washing liquid and the compressed air is sprayed from the spray opening 221a at the time point t5. As a result, the washing liquid, together with the compressed air, collides with the protection window 211 with momentum, and the protection window 211 is thus effectively washed.

At a time point t6 at which the predetermined period TL1 has elapsed since the time point t5, this support device stops the washing liquid pump 40, and closes the on-off valve 223 of the corresponding washer 22, to thereby shut off the flow passage of the corresponding washer 22. On the other hand, this support device does not stop the air pump 224, but continues to operate the air pump 224 at the time point t6. Then, this support device stops the operation of the air pump 224 at a time point t7 at which "the predetermined period TA2 longer than the predetermined period TL1" has elapsed since the time point t5. Therefore, the compressed air alone is sprayed from the spray opening 221a in a period from the time point t6 to the time point t7. As a result, the washing liquid remaining on the protection window 211 can be blown off by the compressed air, and a possibility that "the washing liquid remains on the protection window 211 after the liquid washing, and the washing liquid is dried while foreign matters, dust, and the like are adhered to the protection window 211" can be decreased.

As described above, this support device is configured to set the respective switch sections 530 corresponding to the respective washers 22 configured to wash the respective cameras 21 on the bird's-eye view screen 510 on which the images taken by the respective cameras 21 are displayed. As a result, the passenger of the own vehicle SV can visually recognize the images displayed on the bird's-eye view screen 510, to thereby check whether or not dirt is adhered to the protection windows 211 of the respective cameras 21.

Then, when dirt is adhered to the protection window 211 of any one of the cameras 21, the passenger can determine whether the dirt can be removed through the air washing alone or can be removed through only by the liquid washing, and can then operate the switch section 530 in accordance with the determination result. Thus, when dirt that can be removed through the air washing alone is adhered, the air washing is carried out, and when dirt that can be removed through only by the liquid washing is adhered, a possibility of the execution of the liquid washing increases. As a result, the number of times of the liquid washing can be decreased, and a used amount of the washing liquid can be decreased.

Further, when the operation period TO of any one of the switch sections 530 is shorter than the threshold period TO1th, this support device determines that the operation (first operation) of instructing the air washing is carried out. On the other hand, when the operation period TO of any one of the switch sections 530 is equal to or longer than the threshold period TO1th, this support device determines that the operation (second operation) of instructing the liquid washing is carried out. As a result, such a possibility that the liquid washing is carried out through an operation by mistake can be decreased, and the washing liquid reserved in the tank can less likely be decreased.

(Specific Operation)

Figure 7:
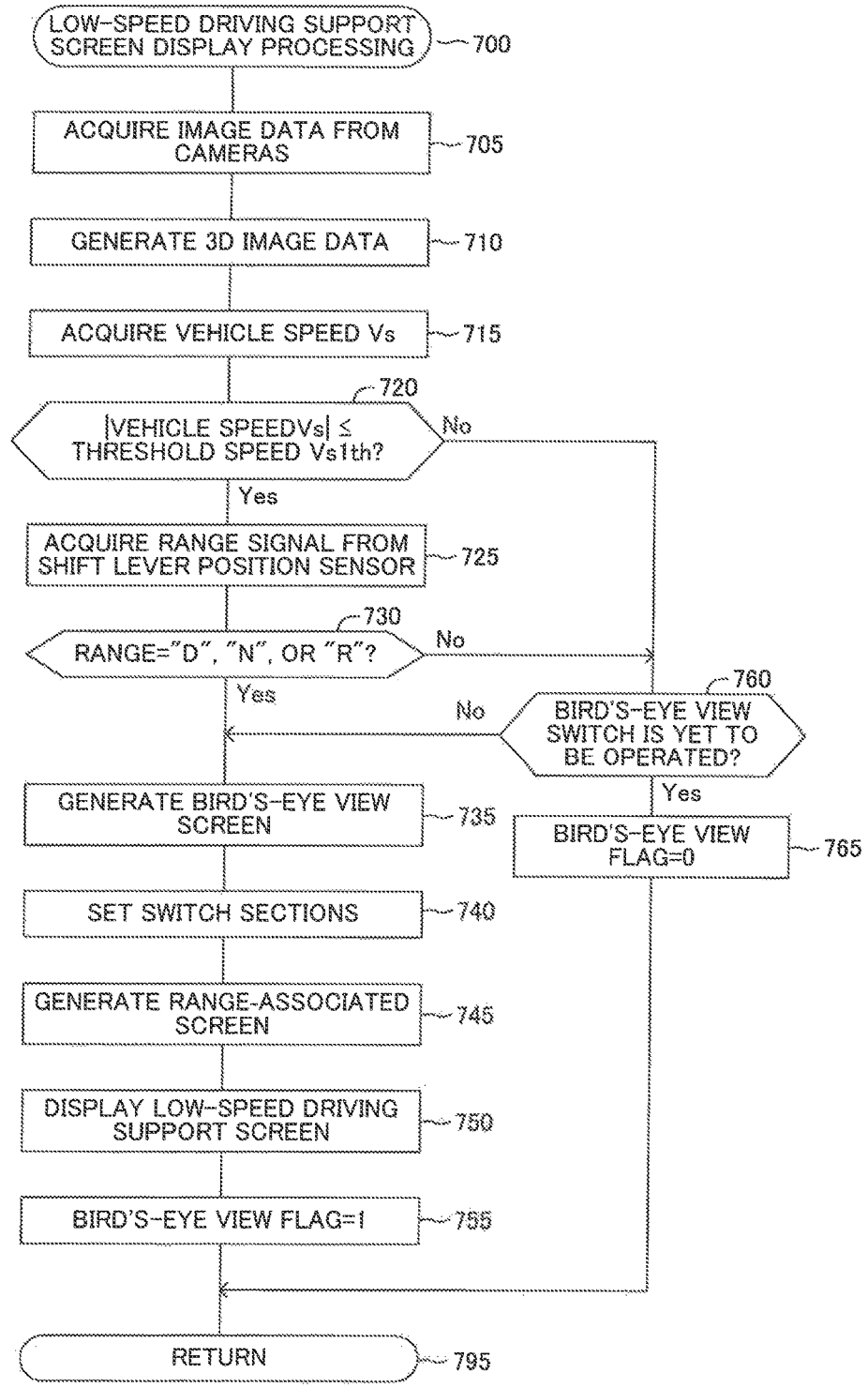
FIG. 7 is a flowchart for illustrating a routine which is executed by a CPU of a driving support ECU illustrated in FIG. 1.

The CPU 11 of the driving support ECU 10 is configured to execute a routine illustrated as a flowchart of FIG. 7 each time a predetermined period has elapsed. The routine illustrated in FIG. 7 is a routine for displaying the low-speed driving support screen 500.

Thus, the CPU 11 starts processing from Step 700 of FIG. 7 at a predetermined timing, proceeds to Step 705, acquires the image data from the respective cameras 21A to 21D, and proceeds to Step 710.

In Step 710, the CPU 11 generates the 3D image data based on the respective pieces of image data acquired in Step 705 as described above, and proceeds to Step 715. In Step 715, the CPU 11 acquires the vehicle speed Vs of the own vehicle SV based on the wheel pulse signals from the wheel speed sensors 60, and proceeds to Step 720.

In Step 720, the CPU 11 determines whether or not the absolute value of the vehicle speed Vs is equal to or lower than the threshold speed Vs1th. When the absolute value of the vehicle speed Vs is equal to or lower than the threshold speed Vs1th, in Step 720, the CPU 11 makes a "Yes" determination, and proceeds to Step 725.

In Step 725, the CPU 11 acquires the range signal from the shift lever position sensor 65, to thereby recognize the range to which the shift lever is set, which is represented by the range signal, and proceeds to Step 730.

In Step 730, the CPU 11 determines whether or not the range recognized in Step 725 is any one of the drive range (D), the neutral range (N), and the reverse range (P).

When the range is any one of the drive range (D), the neutral range (N), and the reverse range (R), in Step 730, the CPU 11 makes a "Yes" determination, and proceeds to Step 735.

In Step 735, the CPU 11 generates the image (peripheral region image 512) of the peripheral region of the own vehicle SV at the time when the own vehicle SV is viewed directly from above in the 3D image data generated in Step 710. Then, the CPU 11 combines the generated peripheral region image 512 and the own vehicle image 511 set in advance with each other, to thereby generate the display data of the bird's-eye view screen 510.

Then, the CPU 11 proceeds to Step 740, sets the switch sections 530A to 530D to the respective regions FRA', LTA', RTA', and RRA' of the peripheral region image 512 of the bird's-eye view screen 510 generated in Step 735, and proceeds to Step 745.

In Step 745, when the range is any one of the drive range (D) or the neutral range (N), the CPU 11 generates the image viewed from the view point in the rear of the own vehicle SV toward the front of the own vehicle SV in the 3D image data, and generates the display data of the range-associated screen 520 containing the generated image. In contrast, when the range is the reverse range (R), the CPU 11 generates the image viewed from the view point in front of the own vehicle SV toward the rear of the own vehicle SV in the 3D image data, and generates the display data of the range-associated screen 520 containing the generated image.

Then, the CPU 11 proceeds to Step 750, displays the low-speed driving support screen 500 on the display 50 (touch panel 50A) based on the display data of the bird's-eye view screen 510 generated in Step 735 and the display data of the range-associated screen 520 generated in Step 745, and proceeds to Step 755.

In Step 755, the CPU 11 sets a value of a bird's-eye view flag to "1", and proceeds to Step 795 to tentatively terminate this routine. The bird's-eye view flag is set to "1" while the low-speed driving support screen 500 is displayed.

Further, when the CPU 11 proceeds to Step 720, and the absolute value of the vehicle speed Vs is higher than the threshold speed Vs1th, in Step 720, the CPU 11 makes a "No" determination, and proceeds to Step 760.

In Step 760, the CPU 11 determines whether or not the bird's-eye view switch 67 is yet to be operated. More specifically, when an operation signal is input from the bird's-eye view switch 67, the CPU 11 determines that the bird's-eye view switch 67 is operated.

When the bird's-eye view switch 67 is not operated, in Step 760, the CPU 11 makes a "Yes" determination, and does not display the low-speed driving support screen 500. Thus, the CPU 11 proceeds to Step 765 to set the value of the bird's-eye view flag to "0", and proceeds to Step 795 to tentatively terminate this routine.

On the other hand, when the bird's-eye view switch 67 is operated, in Step 760, the CPU 11 makes a "No" determination, and proceeds to processing from Step 735 in order to display the low-speed driving support screen 500.

Further, when the CPU 11 proceeds to Step 730, and the range of the shift lever is not any one of the drive range (D), the neutral range (N), and the reverse range (R) (in other words, the range of the shift lever is the parking range (P)), in Step 730, the CPU 11 makes a "No" determination, and proceeds to processing from Step 760.

Figure 8:
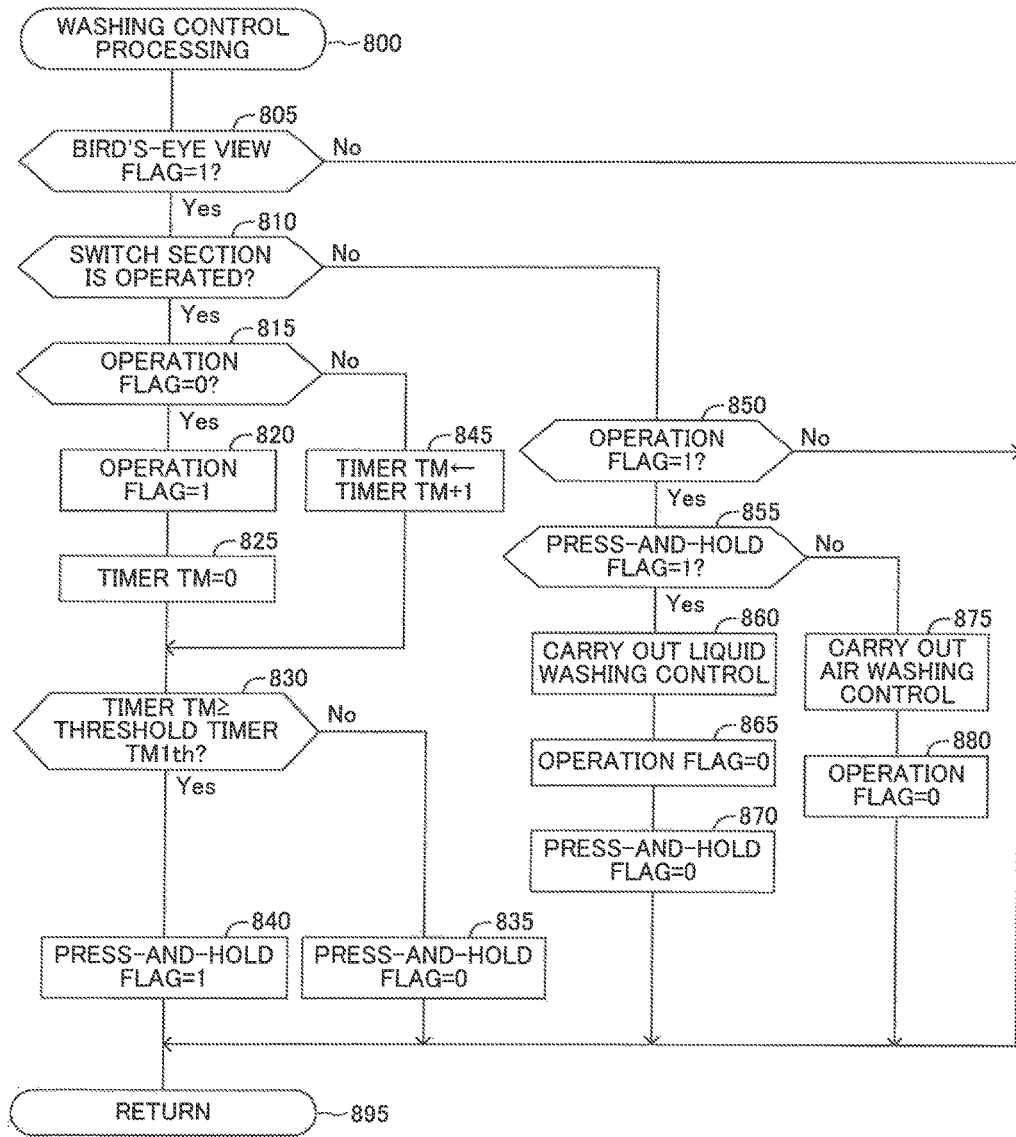
FIG. 8 is a flowchart for illustrating a routine which is executed by the CPU of the driving support ECU illustrated in FIG. 1.

The CPU 11 of the driving support ECU 10 is configured to execute a routine illustrated as a flowchart of FIG. 8 other than the routine illustrated as the flowchart of FIG. 7 each time a predetermined period has elapsed. The routine illustrated in FIG. 8 is a routine of causing the washer 22 to carry out any one of the air washing and the liquid washing in accordance with the mode of the touch operation on the switch section 530. In actuality, the CPU 11 is configured to execute the routine of FIG. 8 for the respective regions FRA', LTA', RTA', and RRA' (in other words, the washers 22 corresponding to "the front switch section 530A, the left side switch section 530B, the right side switch 530C, and the rear switch section 530D" respectively set to those individual regions) independently of one another. A description is now given while focusing on a specific switch section out of those switch sections.

Thus, the CPU 11 starts processing from Step 800 of FIG. 8 at a predetermined timing, proceeds to Step 805, and determines whether or not the value of the bird's-eye view flag is set to "1".

When the value of the bird's-eye view flag is not set to "1", in other words, the value of the bird's-eye view flag is set to "0", the low-speed driving support screen 500 is not displayed, and thus the switch section 530 cannot be operated. Therefore, in this case, in Step 805, the CPU 11 makes a "No" determination, and directly proceeds to Step 895 to tentatively terminate this routine.

When the value of the bird's-eye view flag is set to "1", in other words, the low-speed driving support screen 500 is displayed, in Step 805, the CPU 11 makes a "Yes" determination, and proceeds to Step 810. In Step 810, the CPU 11 determines whether or not the touch operation is carried out on the specific switch section 530 set to any one of the respective regions FRA', LTA', RTA', and RRA' of the peripheral region image 512 of the low-speed driving support screen 500 (whether or not the specific switch section 530 is touched by a finger).

When the touch operation is carried out on the specific switch section 530, in Step 810, the CPU 11 makes a "Yes" determination, and proceeds to Step 815. In Step 815, the CPU 11 determines whether or not a value of an operation flag corresponding to the specific switch section 530 is set to "0".

When the value of the operation flag corresponding to the specific switch section 530 is set to "0", in Step 815, the CPU 11 makes a "Yes" determination, proceeds to Step 820, sets the value of the operation flag to "1.", and proceeds to Step 825. In Step 825, the CPU 111 sets a timer TM for the specific switch section 530 to "0", to thereby initialize the timer TM. In this way, when the passenger touches the region to which the specific switch section 530 is set, the value of the operation flag corresponding to the specific switch section 530 is set to "1", and when the touch operation on this region is finished (when the passenger releases the finger from the region), the value of the operation flag corresponding to the specific switch section 530 is set to "0" (refer to Step 865 and Step 880 described later). While the passenger is continuing to touch the region, "1" continues to be added to the timer TM corresponding to the specific switch section 530 (refer to Step 845 described later). Thus, the value of the timer TM represents the operation period (a continuation period of the state in which the touch operation is being carried out on the switch section 530) TO of the specific switch section 530.

Then, the CPU 11 proceeds to Step 830, and determines whether or not the timer TM corresponding to the specific switch section 530 is equal, to or more than a threshold timer TM1th. In other words, the processing in Step 830 is processing for determining whether or not the operation period TO of the specific switch section 530 is equal to or longer than the threshold period TO1th.

When the timer TM corresponding to the specific switch section 530 is less than the threshold timer TM1th, in other words, when the operation period TO of the specific switch section 530 is shorter than the threshold period TO1th, in Step 830, the CPU 11 makes a "No" determination, and proceeds to Step 835. In Step 835, the CPU 11 sets a value of a press-and-hold flag corresponding to the specific switch section 530 to "0". Then, the CPU 11 proceeds to Step 895 to tentatively terminate this routine.

When the timer TM corresponding to the specific switch section 530 is equal to or more than the threshold timer TM1th, in other words, when the operation period TO of the specific switch section 530 is equal to or longer than the threshold period TO1th, in Step 830, the CPU 11 makes a "Yes" determination, and proceeds to Step 840. In Step 840, the CPU 11 sets the value of the press-and-hold flag corresponding to the specific switch section 530 to "1", and proceeds to Step 895 to tentatively terminate this routine. In this manner, the press-and-hold flag corresponding to the specific switch section 530 is set to "1" when the operation period TO of the specific switch section 530 is equal to or longer than the threshold period TO1th.

Further, when the CPU 11 proceeds to Step 815, and the value of the operation flag corresponding to the specific switch section 530 is not set to "0", in other words, when the value of the operation flag corresponding to the specific switch section 530 is set to "1", in Step 815, the CPU 11 makes a "No" determination, and proceeds to Step 845. In Step 845, the CPU 11 sets a value acquired by adding "1" to the value of the timer TM corresponding to the specific switch section 530 as a new value of the timer TM, and proceeds to processing from Step 830.

Further, when the CPU 11 proceeds to Step 810, and the specific switch section 530 is not operated, in Step 810, the CPU 11 makes a "No" determination, and proceeds to Step 850. In Step 850, the CPU 11 determines whether or not the value of the operation flag corresponding to the specific switch section 530 is set to "1".

When the value of the operation flag corresponding to the specific switch section 530 is not set to "1", in other words, the value of the operation flag corresponding to the specific switch section 530 is set to "0", this value represents that the specific switch section 530 was not being operated at a time point when this routine is executed last time either. In this case, in Step 850, the CPU 11 makes a "No" determination, and proceeds to Step 895 to tentatively terminate this routine.

On the other hand, when the value of the operation flag corresponding to the specific switch section 530 is set to "1", the value represents that the operation being carried out on the specific switch section 530 at the time point when this routine was executed last time has been finished. In this case, in Step 850, the CPU 11 makes a "Yes" determination, and proceeds to Step 855 to determine whether or not the value of the press-and-hold flag corresponding to the specific switch section 530 is set to "1".

When the value of the press-and-hold flag corresponding to the specific switch section 530 is set to "1", the operation period TO of the switch section 530 is equal to or longer than the threshold period TO1th, and the operation on the specific switch section 530 has been finished. Therefore, when the value of the press-and-hold flag corresponding to the specific switch section 530 is "1", the operation (second operation) of instructing the liquid washing by the washer 22 corresponding to the specific switch section 530 can be determined to have been carried out. Thus, in this case, in Step 855, the CPU 111 makes a "Yes" determination, and proceeds to Step 860 to carry out control of causing the washer 22 corresponding to the specific switch section 530 to carry out the liquid washing. In other words, the CPU 11 opens the on-off valve 223, and operates the washing liquid pump 40 from this time point to a time point at which the predetermined period TL1 has elapsed, and operates the air pump 224 of the washer 22 corresponding to the specific switch section 530 from this time point to a time point at which the predetermined period TA2 has elapsed (refer to FIG. 6B).

Then, the CPU 11 proceeds to Step 865 to set the value of the operation flag corresponding to the specific switch section 530 to "0", proceeds to Step 870 to set the value of the press-and-hold flag corresponding to the specific switch section 530 to "0", and proceeds to Step 895 to tentatively terminate this routine.

On the other hand, when the value of the press-and-hold flag corresponding to the specific switch section 530 is not set to "1", the switch operation on the switch section 530 has been finished while the operation period TO of the specific switch section 530 is shorter than the threshold period TO1th. Therefore, when the value of the press-and-hold flag corresponding to the specific switch section 530 is not set to "1", the operation (first operation) of instructing the air washing by the washer 22 corresponding to the specific switch section 530 can be determined to have been carried out. Thus, in this case, in Step 855, the CPU 11 makes a "No" determination, and proceeds to Step 875 to carry out control of causing the washer 22 corresponding to the specific switch section 530 to carry out the air washing.

Then, the CPU 11 proceeds to Step 880 to set the value of the operation flag corresponding to the specific switch section 530 to "0". After that, the CPU 11 proceeds to Step 895 to tentatively terminate this routine.

As described above, with this support device, the function of the switch sections 530 for carrying out the operation of washing the protection windows 211 of the respective cameras 21 is added to the bird's-eye view screen 510 on which the images taken by the respective cameras 21 are displayed. Therefore, the passenger can intuitively determine which camera 21 has the protection window 211 to be washed, and which of the air washing or the liquid washing is to be carried out.

The present invention is not limited to the above-mentioned embodiment, and various modified examples can be adopted within the scope of the present invention. For example, when the touch operation is carried out on the switch section 530, the CPU 11 can determine that "the touch operation" has been carried out "once" regardless of the continuation period of the touch operation. Then, the CPU 11 may determine that the operation (the first operation or the operation in the first mode) of instructing the air washing is carried out when the touch operation is carried out only once in a predetermined period, and determine that the operation (the second operation or the operation in the second mode) of instructing the liquid washing is carried out when the touch operation is carried out twice (or twice or more) in the predetermined period.

Further, this support device may be provided independently of the display 50 (the touch panel 50A which is a display of the touch panel type), and may be configured to use a plurality of switches corresponding respectively to the regions FRA', LTA', RTA', and RRA', to thereby detect (determine) the operated washer 22, and which of the first operation or the second operation the operation is.

In the above-mentioned embodiment, when the washer 22 carries out the liquid cleaning, the washer 22 sprays the mixture of the washing liquid and the compressed air from the spray opening 221a, but may spray the washing liquid alone from the spray opening 221a. In this case, the CPU 11 does not activate the air pump 224 at the time point t5 illustrated in FIG. 6B, but activates the air pump 224 at the time point t6 at which the on-off valve 223 becomes the closed state, and stops the operation of the air pump 224 at the time point t7. In other words, at least the washing liquid only needs to be sprayed from the spray opening 221a in a period from the time point t5 to the time point t6 illustrated in FIG. 6B in the liquid washing. Further, when the liquid washing is carried out, the CPU 11 may spray the compressed air only for a short period before the washing liquid is sprayed. Additionally, when the liquid washing is carried out, the air pump 224 may always be stopped.

In the above-mentioned embodiment, when the washer 22 carries out the air washing, the washer 22 sprays the compressed air alone without spraying the washing liquid, but may combine the spray of the compressed air and another washing mode other than the spray of the washing liquid. As the washing mode other than the spray of the washing liquid, there is, for example, a mode of applying vibration to the protection window 211. As a result of the application of the vibration to the protection window 211, dirt such as water droplets and dusts adhered to the protection window 211 are removed. More specifically, the washer 22 includes a vibration application device (not shown) configured to apply the vibration to the protection window 211, and the vibration application device applies the vibration to the protection window 211 for a predetermined period when the washer 22 sprays the compressed air.

In the above-mentioned embodiment, the low-speed driving support screen 500 is displayed when the vehicle speed Vs of the own vehicle SV is equal to or lower than the threshold speed Vs1th, but the configuration is not limited to this example.

What is claimed is:

1. A driving support device, comprising:
   a camera, which includes a protection window, and is configured to take an image of a peripheral region of an own vehicle through the protection window;
   a display, which is configured to display a peripheral region screen including the image taken by the camera;
   a electronic control unit, which is configured to display the peripheral region screen on the display, to thereby support driving of the own vehicle by a driver;
   a washer, which is capable of selectively carrying out any one of air washing of spraying air toward the protection window in order to wash the protection window without spraying liquid and liquid washing of spraying liquid toward the protection window in order to wash the protection window; and
   a switch, which is configured to be operated by the driver and to detect an operation of the switch by the driver that indicates which of the air washing and the liquid washing is to be carried out,
   wherein the electronic control unit is configured to:
   cause the washer to carry out the air washing when a first operation is detected at the switch; and
   cause the washer to carry out the liquid washing when a second operation is detected at the switch.

2. The driving support device according to claim 1, wherein,
   the display includes a touch panel capable of displaying the peripheral region screen,
   the switch includes a switch of a touch detection type, which is capable of detecting a touch operation on the peripheral region screen displayed on the touch panel, and
   the electronic control unit is configured to determine which of the first operation and the second operation is carried out based on an operation mode of the touch operation.

3. The driving support device according to claim 2, wherein,
   the camera includes a plurality of cameras, the washer includes a plurality of washers, and the switch includes a plurality of switches,
   the respective plurality of cameras are arranged so as to take images of regions different from one another within the peripheral region,
   the respective plurality of washers are provided to the respective plurality of cameras,
   the electronic control unit is configured to display the images taken by the respective plurality of cameras on the touch panel so that the images taken by the respective plurality of cameras form individual regions corresponding to the respective plurality of cameras on the peripheral region screen,
   the plurality of switches are provided for the respective individual regions, and
   the electronic control unit is configured to determine which of the first operation and the second operation is carried out for each of the plurality of washers provided to the respective plurality of cameras corresponding to the respective individual regions based on an operation mode of the touch operation for each of the individual regions.

4. The driving support device according to claim 2, wherein the electronic control unit is configured to:
   determine that the first operation is carried out when a continuation period of the touch operation is shorter than a threshold period; and
   determine that the second operation is carried out when the continuation period of the touch operation is equal to or longer than the threshold period.

5. The driving support device according to claim 1, wherein the electronic control unit is configured to cause the washer to spray the liquid and then spray the air alone toward the protection window when causing the washer to carry out the liquid washing.

* * * * *